April 7, 1959
F. A. DOBSON ET AL
2,881,304
METHOD FOR PRODUCING CORRUGATED CORE
SANDWICH-TYPE STRUCTURAL MATERIAL
Filed Aug. 24, 1953
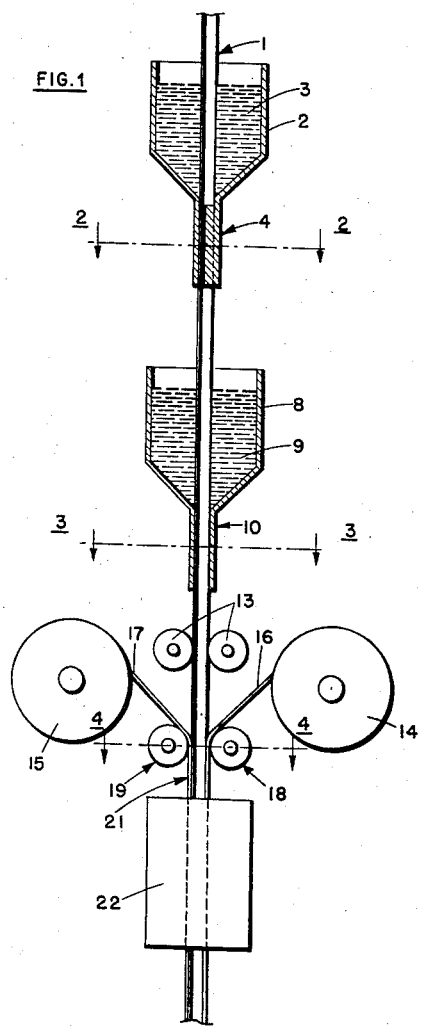
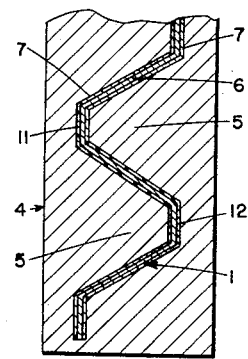
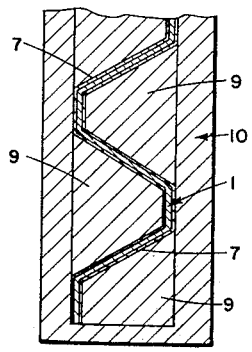
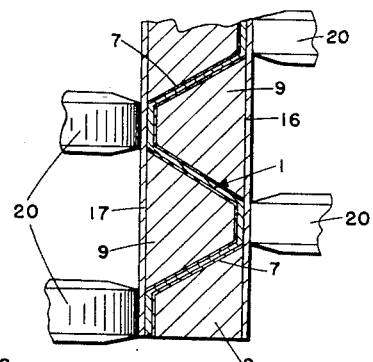
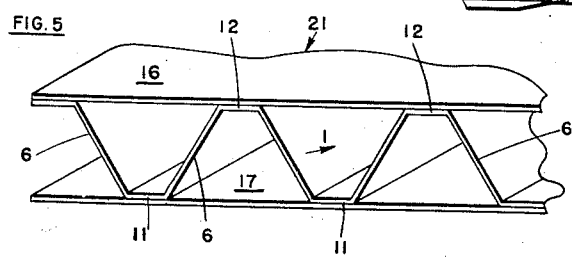
INVENTORS.
FRANKLIN A. DOBSON
BY  NILS O. MYKLESTAD
*William R. Lane*
ATTORNEY

United States Patent Office 2,881,304
Patented Apr. 7, 1959

2,881,304

METHOD FOR PRODUCING CORRUGATED CORE SANDWICH-TYPE STRUCTURAL MATERIAL

Franklin A. Dobson, Whittier, and Nils O. Mykelstad, Long Beach, Calif., assignors to North American Aviation, Inc.

Application August 24, 1953, Serial No. 376,134

2 Claims. (Cl. 219—117)

This invention relates to an improved corrugated core sandwich-type structural material, and a method for making same.

The type of sandwich material in which a longitudinally corrugated core is fastened between two facing sheets has long been considered ideal to solve structural problems where the strength-to-weight ratio is required to be high. Also, improved methods for forming large quantities of such material economically have been developed to increase the possibilities of use of such material.

In order that the weight of sandwich material be kept low, it is essential to form it of components of very thin cross-section. One of the difficulties attendant on forming such material by a process such as that shown in U. S. Letters Patent No. 2,747,064 is maintaining the welding electrodes that support the core internally during the process of welding the facing sheets to the core. High welding pressure and current must be applied across the welding wheels and said electrodes in order to secure a satisfactory weld between the core and the facing sheets. The welding process may be simplified if the welding internal electrodes can be eliminated and both facing sheets welded to the core at the same time by running the sandwich between welding rollers thereby passing the current through one facing sheet, through the core, and through the other facing sheet. However, pressure must then be exerted on the core from both sides by the welding rollers; and it has been found that thin cross-section, longitudinally corrugated core will be deformed by this pressure if not supported, resulting in imperfect welding.

It is therefore an object of this invention to provide a method for producing corrugated core sandwich-type structural material in quantity without the use of internal welding electrodes or mandrels but by adding a removable strengthening material to the core for supporting said core during the process of attaching facing sheets to said core.

Another object of this invention is the provision of a continuous method for producing corrugated core sandwich-type structural material wherein the core of said material is supported by a coating during the securement of the facing sheets to said core.

Another object of this invention is to provide a strengthening material for the core of a corrugated core sandwich-type structural material for supporting said core during the attaching process which material may be easily removed after said process.

A further object of this invention is to provide an improved corrugated core sandwich-type structural material whose core is strengthened to withstand the pressure applied during the process of attaching the facing sheets to said core.

A still further object of this invention is the provision of a corrugated core-sandwich type structural material which is strengthened by a filler added to the core for withstanding forces applied during forming of said material.

Other objects and advantages will become apparent from the following description taken in connection with the accompanying drawings, in which Fig. 1 is a semi-schematic view of apparatus for accomplishing the method of this invention;

Fig. 2 is a sectional view as taken along line 2—2 of Fig. 1;

Fig. 3 is a sectional view as taken along line 3—3 of Fig. 1;

Fig. 4 is a sectional view as taken along line 4—4 of Fig. 1;

And Fig. 5 is a perspective view of the end of the finished product of this invention.

In detail as shown in Fig. 1, a strip of corrugated core 1 of thin-section material is passed through a vat 2 of molten strengthening material 3. This strengthening material 3 may be lead, zinc, tin, or alloys thereof or the like; its important properties being a lower melting point and higher electrical and heat conductivity than the material of which the sandwich is made. From a point where core 1 passes out of vat 2 and extending longitudinally of the path of travel of said core are guides 4 having overlapping ridges 5 extending longitudinally thereof as shown in cross-section in Fig. 2. Ridges 5 are formed so as to occupy a portion of the space between walls 6 of the corrugations of core 1. Between ridges 5 and the material of core 1 a coating 7 of strengthening material 3 will solidify and bond itself to core 1. Guides 4 and ridges 5 extend beyond the point of solidification of material 3 thereby sealing vat 2 in order that molten strengthening material 3 will remain therein.

It is obvious that alternatives are available for performing the step above described; e. g. core 1 may be passed between sprayers for spraying coating 7 thereon, or core 1 may be dipped in a vat of strengthening material 3 in order to form coating 7.

In some instances greater strengthening of core 1 than is provided by coating 7 will be required. In such a case core 1 may be passed through a second vat 8 containing additional strengthening material or filler 9. Vat 8 is similar in construction to vat 2 and has guides 10 extending therefrom. However, guides 10 are straight parallel sheets spaced apart a distance substantially equal to the thickness of core 1 so that filler 9 may completely occupy the remaining space between walls 6 of core 1. Again filler 9 solidifies before core 1 passes out of guides 10. Filler 9 may be similar to material 3 or may be of some non-conductive plastic or the like as long as its melting point is below that of the sandwich material.

Since the coating 7 may cover peaks 11, 12 of corrugations of core 1, which will subsequently become the points of weld, said coating may then be removed from said peaks by passing core 1 between a pair of buffing wheels 13. Alternatively, buffing wheels 13 may be eliminated if the spacing between guides 4 is set so that coating 7 will not be applied to peaks 11, 12 of the corrugations of core 1 in the first instance.

Spaced on either side of the path of travel of core 1 is one of a pair of rotatably mounted drums 14, 15 which carry rolls of flat sheet material or facing sheets 16, 17. These facing sheets are fed from drums 14, 15 to a position adjacent core 1 and said core with said facing sheets so positioned then passes between a pair of welding rollers 18, 19. The aforementioned welding rollers preferably comprise a plurality of electrically conductive discs 20 mounted coaxially but spaced by insulating discs (not shown). As a modification welding rollers 18, 19 may be formed as continuous cylindrical rollers. In the preferred form discs 20 are spaced so as to contact facings 16, 17 adjacent peaks 11 and 12. Pressure is applied to core 1 and facing sheets 16, 17 by rollers 18, 19 and an electric voltage impressed across said rollers causes an electric current to pass through sheets 16, 17 and core 1 to weld each to the other at the points of contact or peaks 11 and 12. Coating 7 and/or filler 9 will sufficiently strengthen core 1 to withstand the pressure applied and heat generated by the welding process. Coating 7 and/or filler 9 also act to conduct the generated heat away from core 1 thereby preventing a temperature rise in said core sufficient to cause deformation thereof. In the event that coating 7 is not removed from peaks 11 and 12 by buffing wheels 13 the heat generated by the welding process will melt coating 7 from between peaks 11 and valleys 12 and sheets 16, 17 so as to not interfere with the weld being formed.

The completed sandwich 21 then passes through a heater 22 which raises the temperature of sandwich 21 to a point sufficient to melt coating 7 and/or filler 9 but which will not anneal or deform the material of which the sandwich is made.

It is obvious that either coating 7 or filler 9 may be used alone or in conjunction as shown depending upon the strength requirements in the individual case. As a modification, filler 9, when used alone, may be of a material such as plaster or the like. In such case, rather than melting filler 9 as above described, said filler may be dissolved out of the sandwich by a suitable solvent.

It will be noted that filler 9 will also serve as strengthening means for the sandwich when said sandwich is to be formed into a shape deviating from that in which it is produced. It is important, then, that the removal of filler 9 not be accomplished until after the forming process has been performed.

Although a continuous process has been shown, it is obvious that the process may be intermittent if desired.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An improved method for producing corrugated core sandwich-type structural material comprising forming a thin coating of electrically conductive, relatively low melting point strengthening material on non-peak portions of a relatively thin-section corrugated metal core, positioning said strengthened core between facing sheets of flat sheet metal material with the peaks of said corrugated core in direct contact with said sheets, resistance welding said sheets to said peaks, heating said sandwich material to a temperature above said low melting point of said strengthening material to melt same, and removing said molten strengthening material from between said sheets.

2. An improved method for producing corrugated core sandwich-type structural material comprising applying a relatively thin coating of electrically conductive, relatively low melting point strengthening material to a relatively thin-section corrugated core, removing said coating from the peaks of said core, positioning said core between two facing sheets of flat sheet material with said peaks of said core in direct contact with said sheets, resistance welding said sheets to said peaks, and removing said strengthening material from between said sheets.

References Cited in the file of this patent

UNITED STATES PATENTS

| | | |
|---|---|---|
| 669,698 | Ivins | Mar. 12, 1901 |
| 1,247,250 | Field | Nov. 20, 1917 |
| 1,674,941 | Bart | June 26, 1928 |
| 1,930,285 | Robinson | Oct. 10, 1933 |
| 2,060,608 | Butler et al. | Nov. 10, 1936 |
| 2,299,776 | Weightman | Oct. 27, 1942 |
| 2,406,051 | Weiss | Aug. 20, 1946 |
| 2,423,870 | Blessing | July 15, 1947 |
| 2,451,442 | Meissner | Oct. 12, 1948 |
| 2,778,458 | Briggs | Jan. 22, 1957 |